United States Patent
Strien et al.

[15] 3,697,128
[45] Oct. 10, 1972

[54] MOTOR VEHICLE SEAT

[72] Inventors: Werner Strien, Stuttgart-Heumaden; Eberhard Faust, Stuttgart-Degerloch, both of Germany

[73] Assignee: Recaro Aktiengesellschaft, Glarus, Switzerland

[22] Filed: Dec. 3, 1969

[21] Appl. No.: 881,687

[30] Foreign Application Priority Data

Dec. 5, 1968 Germany..........P 18 12 785.0
Jan. 31, 1969 Germany..........P 19 04 687.8

[52] U.S. Cl. ...................297/216, 297/361, 297/380
[51] Int. Cl. ...............................................B60r 21/00
[58] Field of Search......297/216, 386, 389, 378, 379, 297/388, 284, 361

[56] References Cited

UNITED STATES PATENTS

| | | | |
|---|---|---|---|
| 2,682,931 | 7/1954 | Young | 297/216 X |
| 2,966,200 | 12/1960 | Fredhold | 297/216 |
| 2,971,566 | 2/1961 | Negroni | 297/216 |
| 2,933,127 | 4/1960 | Brewster | 297/216 |
| 3,091,496 | 5/1963 | Bentley | 297/386 |
| 3,059,966 | 10/1962 | Spielman | 297/216 |
| 3,081,059 | 3/1963 | Hastings | 297/216 |
| 3,188,133 | 6/1965 | Tewksbury | 297/380 X |
| 3,224,808 | 12/1965 | Spielman | 297/378 X |
| 3,424,492 | 1/1969 | Tabor | 297/379 |

FOREIGN PATENTS OR APPLICATIONS

| | | | |
|---|---|---|---|
| 1,039,131 | 8/1966 | Great Britain | 297/216 |

*Primary Examiner*—Francis K. Zugel
*Attorney*—Arthur O. Klein

[57] ABSTRACT

A seat construction for a motor vehicle in which the seat occupant is strapped to the back rest by a safety belt which is secured to the seat rather than to the vehicle body and in which energy-absorbing or dissipating means are provided for consuming a considerable amount of the energy which is produced by the forward propulsion of the seat occupant, for example, in a headon collision, so that the pressure which is then exerted by the safety strap upon the body of the seat occupant will not exceed the bearable limit and this person will thus not be injured at least by the safety belt.

7 Claims, 15 Drawing Figures

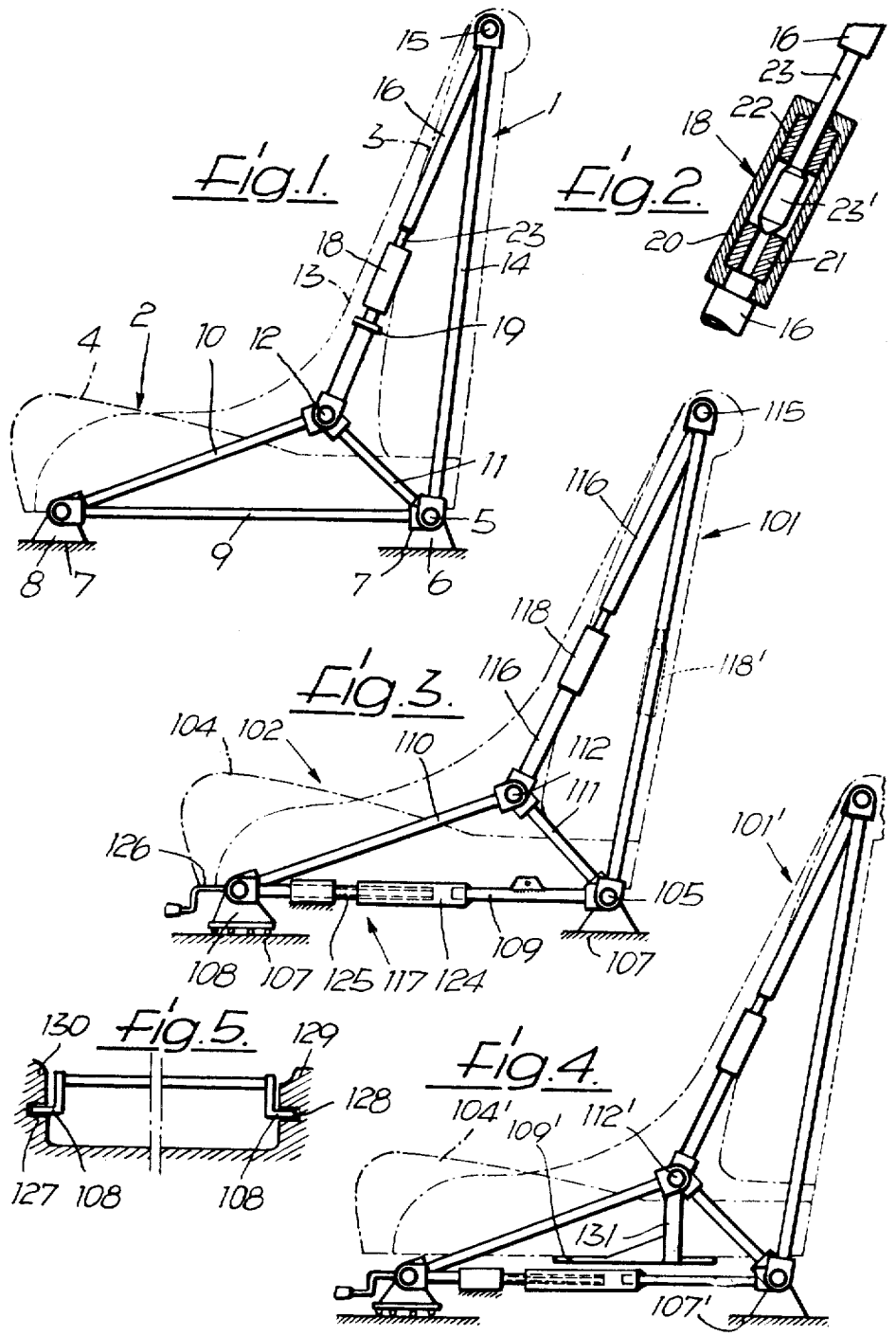

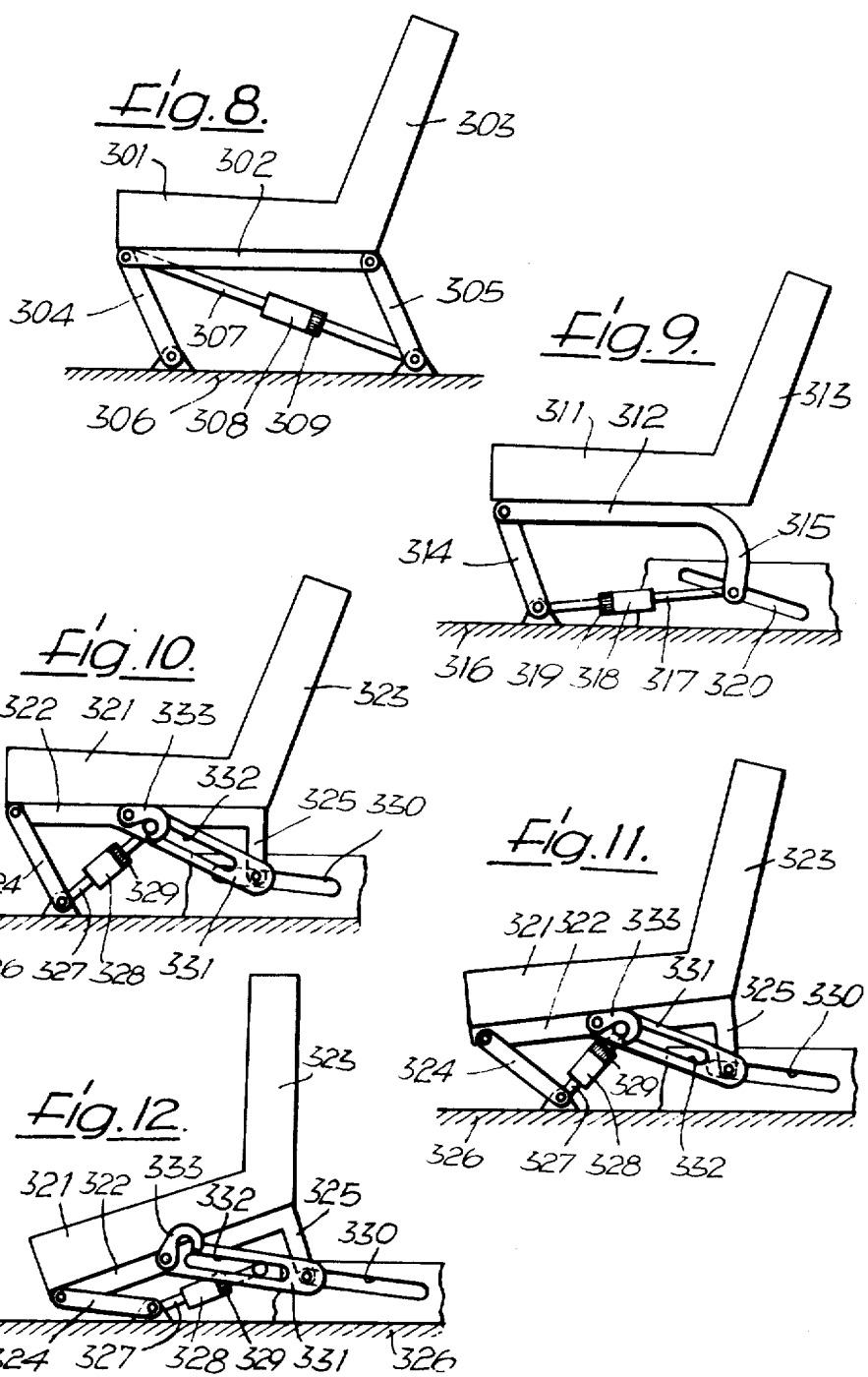

Inventors:
WERNER STRIEN and
EBERHARD FAUST

BY: Arthur O. Klein
ATTORNEY

MOTOR VEHICLE SEAT

The present invention relates to a seat for a vehicle, and especially a motor vehicle, upon which the seat occupant is adapted to be strapped by one or more safety belts.

In all automobiles and other motor vehicles which were provided with safety belts prior to this invention, these belts were secured to parts of the vehicle body. If such a vehicle is suddenly and strongly decelerated, for example, by a head-on collision, the safety belt alone must prevent the seat occupant from being propelled forwardly. This may lead to such a severe pressure by the safety belt upon the body of the seat occupant that the latter may suffer serious injuries. Furthermore, since the safety belt leaves the load of such a person unguarded, the head may be propelled forwardly so severely that the cervical vertebrae of this person may be dangerously bent or even injured seriously.

It is an object of the present invention to provide a seat structure for a motor vehicle which, although it may be of a low cost, considerably reduces or even entirely eliminates the danger to which the seat occupant may be subjected due to the fact that in an accident he is strapped to the seat by a safety belt.

For attaining this object, the present inventors proceeded from the concept that it would be possible to reduce the load which a safety belt might exert upon the body of the seat occupant by permitting the latter at a sudden strong deceleration of the vehicle to move for a certain distance relative to the vehicle and by at least partly absorbing the kinetic energy of the body of the seat occupant by an energy-absorbing or dissipating device. It is therefore the principal feature of the present invention to attain the above-mentioned object by providing suitable means which connect at least the back rest of the seat, to which at least one of the securing means of the safety belt is secured, to a solid seat-supporting base or floor and which comprise at least one structural element which, when the load upon the safety belt and by the latter upon the body of the seat occupant reaches a predetermined limit, hereafter also called the bearable limit, permits at least the back rest of the seat together with the seat occupant to move forwardly for a certain distance, and which during this movement absorbs or dissipates at least some of the energy which is produced by this movement of the seat and the body of its occupant.

Since at least one of the securing means of the safety belt is secured to the back rest, the forces which are produced by the forward propulsion of the body of the seat occupant when a strong deceleration of the vehicle occurs are transmitted by the safety belt to the back rest and thereby tend to pull the backrest forwardly. The energy-dissipating connecting element which is adapted to take up these forces which are exerted upon the back rest therefore only needs to be designed so as to permit a forward movement of the back rest not until the pressure which the safety belt exerts upon the body of the seat occupant reaches the limit which such a person can still bear without injury. The energy dissipating connecting element is preferably further designed so as to maintain this value during the entire movement of the back rest so that during the relatively short distance which is usually available for this movement the largest possible part of the kinetic energy of the body of the seat occupant will be taken up and dissipated by the connecting element.

For reasons of design and manufacture as well as for the reason of a lack of sufficient space it is advisable to combine the energy-dissipating element with the actual seat part of the seat so that the back rest will only be indirectly supported through the seat part relative to the solid seat-supporting base. If, for example, due to a head-on collision of the vehicle the stresses which are exerted by the safety belt upon the body of the seat occupant exceed the bearable limit, only the back rest will then move forwardly while the seat part remains immovable relative to its solid support. The seat structure may then be designed so that this movement of the back rest may be either a pivoting movement, a translatory movement or a combination of a pivoting movement and a translatory movement. However, since it is merely necessary to permit the body of the seat occupant to move forwardly relative to the vehicle when the deceleration of the vehicle exceeds the bearable limit, the same purpose may also be attained if not only the back rest but the entire seat may carry out a pivoting movement, while at the same time a material part of the energy will be dissipated which is produced by the deceleration or impact of the vehicle and the resulting movement of the seat occupant. By numerous experiments and practical tests it has been found that seat constructions of the last-mentioned type have the advantage that in the event of a serious collision of a vehicle the upper part of the body of the seat occupant will not be pivoted toward his legs. According to a preferred embodiment of the invention, this may be attained by providing at least the front end of the seat part with supporting legs or brackets which are pivotably connected to this seat part as well as to the solid supporting base or floor.

These supporting legs permit the entire seat to move relative to the solid floor, which has the result that in the event of a collision the seat occupant will be firmly held on his seat without danger that the load which the safety belt will then exert upon his body will cause any injuries.

The means for supporting the seat part near its rear end relative to the base or floor may be of various designs. Thus, for example, these means may likewise consist of supporting legs which are pivotably connected to the seat part and to the floor so that the front and rear supporting legs together with the seat part and the floor form an adjustable parallelogram. The energy-dissipating connecting element is then preferably mounted so as to extend diagonally through this parallelogram. According to another feature of the invention, this diagonal connecting element may also be provided with a device for manually adjusting its total length with the result that the shape of the parallelogram will be altered and the height of the seat from the floor will be varied. This adjusting advice may be combined with the energy-dissipating element so as to form a structural unit.

According to another embodiment of the invention, the seat part is provided near its rear end with supporting legs which are rigidly secured thereto and the lower ends of which are slidable in guide means which extend substantially in the longitudinal direction of the seat and are secured to the floor. In order to pivot the seat as much as possible forwardly and downwardly during its forward movement against the action of the energy-dissipating element, it is advisable to incline the guide means upwardly toward their front end since this causes the seat to tilt over forwardly and downwardly. The energy dissipating element may then connect the lower end of one or both rear legs to a position at the base or floor, for example, to the pivot axis of the front legs, from which the distance to the end of the rear legs decreases when the seat moves forwardly when the stresses reach approximately the bearable limit.

According to another embodiment of the invention, one end of the energy-dissipating element is pivotably connected to the floor, for example, at the pivoting point of the front legs, while its other end is slidable along guide means which extend from the seat part obliquely downwardly and toward the rear. In this embodiment a locking device is provided for locking the slidable end of the energy-dissipating element in a fixed position when the seat is located in its normal sitting position. This embodiment of the invention is especially of advantage for being employed in a two-door sedan or similar motor vehicle since by releasing the locking device, for example, by hand, the seat may be shifted forwardly and tilted downwardly since the slidable end of the energy-dissipating device will slide toward the rear end of the guide means. This permits a passenger to enter easily behind this seat so as to sit down in a rear seat. When the locking device is in the position in which it locks the slidable end of the energy-dissipating element in a fixed position, the seat may slide forwardly and tilt downwardly only at a sudden strong deceleration of the vehicle against the action of the energy-dissipating element. It is of advantage that the seat will then be pivoted about a relative large angle since the space available for a forward movement of the seat is relatively small. It is also possible in this seat construction to combine the energy-dissipating element with a device for adjusting its effective normal length for the purpose of varying the height of the seat from the floor since by such a length adjustment the front legs of the seat will be pivoted to a different angle.

At the occurrence of a very strong deceleration of the vehicle it is also possible to hold the seat occupant by means of the safety belt on his seat without being injured by the belt if the forward movement of the seat be employed for pivoting the seat toward the rear so that the front edge of the seat part will move upwardly and its rear edge move downwardly and at the same time forwardly. Such a pivoting movement of the seat will place the seat occupant, for example, at a strong impact of the vehicle, into a more or less reclining position with the result that by his inertia he will be pressed more firmly against the seat part.

Such a movement of the seat may according to another feature of the invention be attained by inclining the longitudinal guide means for the rear legs of the seat from their rear ends at least for a certain part of their length in the downward direction and by pivotably connecting the front legs in such a manner to the seat part and to the floor that, when the seat is in its normal sitting position, these front legs are inclined upwardly and toward the rear. If, for example, in an accident, the seat tends to be propelled forwardly, the front legs will pivot upwardly and lift the front end of the seat part, while the rear end of the seat part will move downwardly and forwardly and the back rest will thereby tilt toward the rear.

The energy-dissipating element is preferably provided in this case in the form of a locking device which releases the seat when the front legs of the latter are pivoted forwardly and upwardly about a small angle so that the bearable load of the safety belt upon the seat occupant will pivot the seat as quickly as possibly into the relatively safe accident position. The energy-dissipating element may therefore in this case be provided, for example, in the form of at least one pin which, when the load of the safety belt reaches the still bearable limit, will be shorn off, for example, by one of the pivoting front legs. In order to prevent the seat from being tilted over toward the rear beyond the accident position, it is advisable to provide a suitable stop member. In addition to such a shearing pin, it is also possible to provide the lower ends of the front legs of the seat with friction brakes.

If such a seat is to be employed in a vehicle in which the seat should also be tilted forwardly by hand, for example, in order to permit a passenger of a two-door sedan to enter the vehicle behind the tilted front seat so as to be able to sit down on a rear seat, the energy-dissipating pin and the stop member may be designed so as to permit them to be moved, for example, by hand, to an inactive position. In order to permit the seat then to be pivoted forwardly and downwardly, it is advisable to design the guide means for the rear legs so that their front end curves upwardly as far as possible. This has the result that the back rest will then be pivoted very far forwardly and downwardly.

The energy-dissipating elements according to the invention may be of many different designs. Since after a sudden strong deceleration of the vehicle the seat occupant must be prevented from again being propelled toward the rear, the energy-dissipating elements should be preferably of a type so as actually to dissipate energy and not merely to convert it in a manner which may again be reversed. Elements which reversally convert the energy may be employed, however, if suitable locking means are provided which are capable of storing the absorbed energy for a certain length of time or of retarding its transmission for a considerable length of time. Such elements which may be truly regarded as energy-dissipating devices may be, for example, of the type which convert the absorbed energy by friction into heat or employ this energy in order to deform a suitable part permanently by cold-deformation. It is, however, also possible to employ shock absorbers of a conventional type, provided special means are provided for insuring that such shock absorbers will not become effective until the load upon the back rest reaches the predetermined maximum limit. This may be effected, for example, by providing an element which may be subjected to tension, bending or shearing and which at first takes up the load from the back rest and does not permit the shock absorber to be acted upon until it has been broken or destroyed when the predetermined maximum load has been reached.

For reasons of manufacture and attaining a most practical design, it is usually advisable to secure the back rest pivotably to the seat part, especially also because it is then possible to adjust the inclination of the back rest in a simple manner relative to the seat part. However, the back rest may also be connected to the seat part by means of an elastic intermediate element which is suitable, for example, also for so-called bucket seats, or to provide suitable guide means, for example, in the form of an adjustable parallelogram, which permit the back rest to be shifted in the longitudinal direction of the seat.

The energy-dissipating element may be connected to or combined into a structural unit with a back-rest adjusting device and/or with a hinge fitting which connects the back rest to the seat part. This may be attained by a simple construction, for example, in a manner as disclosed by prior patents of the applicants or their assignees in regard to hinge fittings for motor vehicle seats, in which the hinge fitting is designed so as to act as a friction brake.

In order to make the seat of the lowest possible weight and to require the lowest possible amount of material for producing its supporting parts, it is advisable to employ a construction in which the stresses which are exerted by the safety belt upon the seat only result in compressive or tensile stresses but not in bending stresses upon parts of the seat frame. This may be attained by providing the back rest and/or the seat part at least at the lateral side to which the safety belt is secured with a framework, hereafter called a truss, the individual bars or rods of which define a plane which extends parallel to the longitudinal plane of the seat within which the back rest is pivotable or is inclined thereto at no more than an acute angle. If the back rest is to be pivotable forwardly and at least some of the truss joints of the truss of the back rest are provided in the form of hinges, the rear rod of such a truss will be subjected to tension and the front rod to compression. If such a truss is employed for supporting a seat, the upper rods of this truss will then accordingly be subjected to compression and the lower rod to tension when the back rest is supported on these upper rods. Trusses of this kind which extend at both sides forwardly on the back rest and upwardly on the seat part may, for example, be embedded in lateral bulges of the seat and back rest so as not to be noticeable. The trusses may, of course, also be designed so that at least a part of its rods or bars are also subjected to bending stresses. This would apply, for example, if the truss of the back rest does not extend up to the upper end of the latter but if the safety belt is secured to this upper end. Generally speaking, however, it is more advisable to design the seat according to the invention in a manner so as to avoid bending stresses.

When supporting the seat and/or back rest by means of such trusses and at least some of the truss joints are provided in the form of hinges, the energy-dissipating element may be inserted into the connection between two adjacent truss joints or form such a connection. It is usually of minor importance between which adjacent truss joints the energy-dissipating element is inserted provided that this element, if it has to take up compressive stresses, is inserted between two truss joints which when subjected to such stresses tend to move toward each other or, that if it has to take up tensile stresses, it is inserted between two truss joints which when subjected to such stresses tend to move away from each other.

When employing one or more trusses in which at least some of the truss joints are provided in the form of hinges, it is also very easily possible to effect an adjustment of the inclination of the back rest. It is then only necessary to provide one rod of a truss with a device for adjusting it to different lengths and for locking it in the adjusted position. Such a back-rest adjusting device may connect, for example, a fixed bearing of the seat with a movable bearing which is slidable in the longitudinal direction of the seat. This adjusting device may then be located underneath the seat and thus in a position in which it is not directly noticeable. If according to a preferred embodiment of the invention the trusses are designed so that their rods or bars form an adjustable parallelogram which connects the back rest to the seat part, two diametrically opposite truss joints of this parallelogram may be connected to each other by a structural unit which consists of an energy-dissipating element which is combined with a back-rest adjusting device, and also permits the height of the seat from the floor to be adjusted.

When employing, for example, triangular trusses on the seat part so that at least one upper pair of truss joints is provided in the form of hinges on the opposite lateral sides of the seat part, and if the height of these two hinge points changes substantially equally when the inclination of the back rest is being adjusted, for example, by making one of the rods of each truss of an adjustable length, it is also very easily possible to adjust the seat part to different heights from the floor. It is then only necessary to suspend a seat-cushion support on these upper hinge parts. If the rod of an adjustable length serves as a back-rest adjusting device, a pivoting movement of the back rest toward the rear will at the same time result in a reduction of the height of the seat, while a forward pivoting movement of the back rest will cause the seat to be lowered.

The features and advantages of the following invention will become further apparent from the following detailed description thereof which is to be read with reference to the accompanying diagrammatic drawings, in which:

FIG. 1 shows a side view of the supporting structure of a seat according to a first embodiment of the invention, in which the outlines of the cushion surfaces are indicated in dot-and-dash lines;

FIG. 2 shows an enlarged longitudinal section of the energy-dissipating element according to the invention as employed in the seat structure according to FIG. 1;

FIG. 3 shows a side view similar to FIG. 1 of another embodiment of the invention;

FIG. 4 shows a side view similar to FIG. 1 of a modification of the seat supporting structure according to FIG. 3 in which the seat part is adjustable to different heights;

FIG. 5 shows a cross section of the adjustable foot bracket as shown in FIG. 3;

FIG. 8 shows a very diagrammatic side view of another embodiment of the invention;

FIG. 9 shows a side view similar to FIG. 8 of a further embodiment of the invention;

FIG. 10 shows a side view of a modification of the embodiment as shown in FIG. 9 with the seat in its normal sitting position;

FIG. 11 shows a side view of the seat according to FIG. 10 in the accident position;

FIG. 12 shows a side view of the seat according to FIG. 10 in the entering position;

FIG. 14 shows a side view of the seat according to FIG. 13 in the accident position; while

Figure 6:
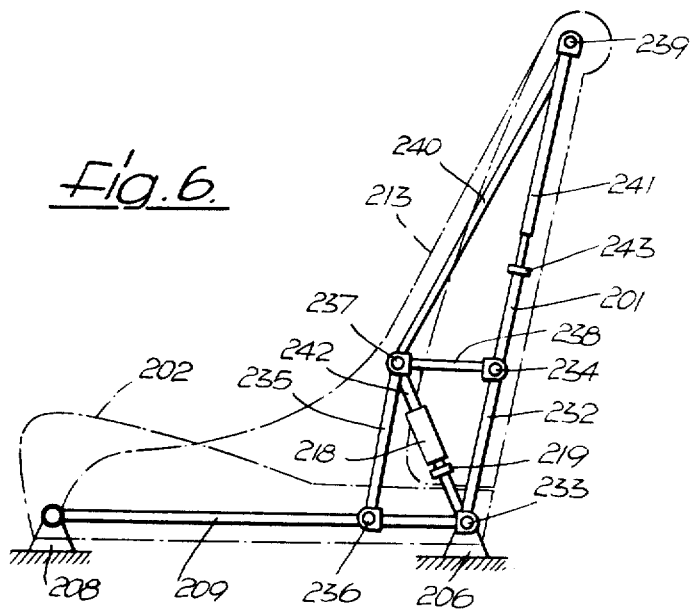
FIG. 6 shows a side view similar to FIG. 1 of another embodiment of the invention with a back rest which is adjustable in the longitudinal direction of the seat.

Referring first particularly to FIG. 1 of the drawings, the seat for a car or other motor vehicle comprises separate tubular frames for supporting the cushion 3 of the back rest 1 and the cushion 4 of the seat part 2. Both frames are connected to each other at their opposite sides by means of two hinge fittings 5 of which only one is shown. These two hinge fittings are supported by rear foot brackets 6 which are rigidly secured to a fixed base 7, for example, to the floor of the car. The tubular frame of the seat part 2 is supported in front by two foot brackets 8 which are likewise rigidly secured to the floor 7 of the car.

Each of the two longitudinal rods or bars 9 of the frame of the seat part 2, only one of which is shown, forms one arm of a triangular truss. The two frame parts at the two lateral sides of the seat are substantially identical so that only the one which is shown in FIG. 1 needs to be described.

The front end of the longitudinal bar 9 is rigidly secured to a bar 10 which extends obliquely upward and to the rear, and the rear end of bar 9 is secured to bar 11 which extends obliquely upward and toward the front. The other ends of the two bars 10 and 11 of the triangular truss are connected to each other by a truss joint 12. As may be seen in FIG. 1, the shorter bar 11 is made of such a length relative to the longer bar 10 that the truss joint 12 will be located slightly above the seat cushion 4 and slightly in front of the back cushion 3. The plane which is defined by this triangular truss extends parallel to the plane within which the back rest 1 is pivotable and which extends at a right angle to its pivot axis. Truss 9 to 12 may therefore be easily embedded within a lateral bulge 13 which projects for a maximum distance from the seat cushion adjacent to the hips of the seat occupant and gradually decreases in distance from the back cushion toward the upper edge of the back rest 1. Of course, the other side of the seat which is not shown may be provided with a similar lateral bulge.

The two frame bars 14 at both lateral sides of the back rest which extend in the longitudinal direction thereof likewise form parts of two equal triangular trusses which are embedded within the lateral forwardly projecting bulges 13.

The upper end of bar 14 is connected by a hinge fitting 15 to one end of a bar 16 the other end of which is pivotably connected to the truss joint 12. Bars 14, 16 and 11 which together form this truss define a plane which likewise extends parallel to the plane within which the back rest 1 is pivoted.

Bar 16 is interrupted by a device for adjusting the inclination of the back rest and also by an energy-absorbing or dissipating element 18. In the embodiment of the invention as illustrated in FIG. 1, these two devices are combined into one structural unit. By turning a hand wheel 19 in one direction the effective length of bar 16, i. e. the distance between its opposite ends, may be reduced and the back rest will thereby be pivoted forwardly, while by turning this hand wheel 19 in the other direction, the effective length of bar 16 will be increased and the back rest will be pivoted more toward the rear. Suitable locking means, not shown, may be provided for preventing the adjusted length of bar 16 from being changed unintentionally.

It is the purpose of the energy-dissipating element 18 to permit the total length of bar 16 to be changed if it is subjected to compressive or tensile stresses beyond certain predetermined limits. At such a change in length of bar 16, the energy-dissipating element 18 is further designed to absorb energy and to dissipate or convert the same in an irreversable manner. In the embodiment of the invention as illustrated in FIGS. 1 and 2, this object is attained by providing this element 18 in the form of a casing 20 which is connected to the part of bar 16 which is pivotably connected to the truss joint 12, and by mounting two bushings 21 and 22 of different inner diameters at a certain axial distance from each other in this casing 20. These two bushings are connected to casing 20 so as not to be movable in their axial direction. These two bushings are separated by the thicker head 23' of a rod 23 which is rigidly connected to the part of bar 16 which leads to the hinge fitting 15. The shank of rod 23 is longitudinally slidable in bushing 22. While the diameter of the bores in both bushings 21 and 22 is smaller than the diameter of the head 23', the bore in bushing 21 is of a smaller diameter than the bore in bushing 22.

The safety belt (not shown) with which the seat occupant is strapped upon his seat is to be secured at one end to the hinge fitting 15 and at the other end to the hinge fitting 5 at the other side of the seat which cannot be seen in FIG. 1, or, if it is a three-point safety belt, it is also to be secured on the hinge fitting 5 which may be seen in FIG. 1. If a sudden strong deceleration of the vehicle occurs, for example, by a head-on collision, the forwardly propelling body of the seat occupant straining against the safety belt will tend to move the upper end of the back rest 1 forwardly and will thereby exert compressive stresses upon bar 16. The diameter of the bore in bushing 21 is therefore made of such a size that the head 23' will not be forced through bushing 21 until the load which is exerted by the safety belt upon the body of the seat occupant just reaches the highest value which is bearable without causing any injuries. The energy of the thrust which is taken up by the element 18 during the pivoting movement of back rest 1 toward the front which is caused by the movement of the shank 23 relative to bushing 21 will be spent for the cold deformation of bushing 21. The head 23' may penetrate only to the lower end of bushing 21 which limits the angle to which the back rest 1 may be pivoted.

Since even at a sudden high acceleration of a car in which the seats according to the invention are mounted, as it may occur, for example, by the impact upon its rear end by another car, it is of advantage to take up at least a part of the energy of the impact by an energy-absorbing or dissipating element, the bore in bushing 22 is made of such a diameter that the head 23' can be drawn through it only by deforming the bushing 22. Numerous experiences and practical tests have shown that very advantageous results may be attained if the energy-absorbing or dissipating element 18 of the embodiment of the invention as illustrated in FIG. 1 is designed so that the force which is required for the last-mentioned purpose is approximately 5 times as small as the force which is required for forcing the head 23' through the bushing 21.

Since the force which is transmitted by the safety belt acts at the upper end of the back rest only upon the side where the hinge fitting 15 is located, it is usually only necessary to provide such an element 18 in the bars 16 of the triangular trusses at both sides of the back rest.

In the embodiment of the invention as illustrated in FIG. 3, all those parts which are similar to the parts of the embodiment according to FIG. 1 are designated by reference numbers which are increased by 100 over those as used in FIG. 1. The truss joint 112 between the adjacent ends of bars 110 and 111 is in this case provided in the form of a hinge fitting since the device 117 for adjusting the back rest is not provided in bar 116 but in bar 109. This also requires one of the two pairs of foot brackets — in this case the front bracket 108— to be adjustably connected to the fixed base 107, for example, to the floor of the car, in a manner so as to be movable in the longitudinal direction of the seat.

The back-rest adjusting device 117 comprises a tubular internally threaded casing 124 which is rigidly secured to the part of bar 109 which is connected to the hinge fitting 105, and a screw spindle 125 which is rotatably connected to the part of bar 109 leading to the front foot bracket 108 and is adapted to be screwed to different depths into the casing 124 by means of a hand crank 126 which is located underneath the front end of the seat cushion 104. When the total length of bar 109 is changed by means of the back-rest adjusting device 117, truss joint 112 pivots about the hinge fitting 105 at a radius which is equal to the length of bar 111.

The energy-dissipating element 118 is interposed between two sections of bar 116 in the same manner as the element 18 in FIG. 1, although it may, of course, also be provided at another position of the truss as indicated in dotted lines in FIG. 3 by the element 118' between two sections of bar 114.

FIG. 5 illustrates that for preventing the front foot brackets 108 from being lifted off the base 107, they are slidable in guides 127 and 128 which are only open at the sides facing each other and are located in the door sill 129 and in the drive-shaft tunnel 130, respectively.

The further embodiment of the invention as illustrated in FIG. 4 differs from that according to FIG. 3 only by the addition of a cushion support 109' which supports the seat cushion 104' and is suspended on the pivotable truss joints 112' at both sides of the seat. Since the distance between the joint 112' and the base 107' increases when the back rest 101' is pivoted toward the rear and decreases when the back rest is pivoted forwardly, such a change in the inclination of the back rest will also result in an adjustment of the height of the seat from the base or floor 107'.

FIG. 6 illustrates an embodiment of the invention in which the back rest 201 is adjustable relative to the seat part 202 in the longitudinal direction of the latter. For this purpose, a truss is provided on each of both sides of the back rest and extends within a longitudinal plane of the seat and is embedded in a lateral bulge 213 of the seat. Since these two trusses are of the same shape and construction, only one of them will hereafter be described.

The rear end of a longitudinal bar 209 of the seat frame which carries the seat part 202 and is rigidly supported by the rear and front foot brackets 206 and 208 carries the lower end of a bar 232 which is pivotably connected thereto and extends in the longitudinal direction of the back rest 201 and slightly in front of the rear surface of the back rest. This bar 232 leads from the truss joint 233, which forms the point of connection to the longitudinal bar 209, to a truss joint 234 which likewise forms a hinge and is located approximately at the level of the hips of the seat occupant. A bar 235 of the same length as bar 232 is pivotably connected to the longitudinal bar 209 by a truss joint 236 which is spaced from the truss joint 233. The upper end of bar 235 is connected to a truss joint 237 which forms a hinge fitting and is connected to the truss joint 234 by a bar 238 which has a length equal to that of the section of the longitudinal bar 209 which connects the two truss joints 233 and 236. This section and bars 232, 235 and 238 therefore form an adjustable parallelogram.

Adjacent to the upper end of back rest 201 another truss joint 239 is provided which is connected by a bar 240 to the truss joint 237 and by a second bar 241 to the truss joint 234. A shell, not shown, which carries the cushion of the back rest is connected at its upper end to the truss joint 239 and at its lower end to the truss joint 237.

A bar 242 extends from the truss joint 233 diagonally through the parallelogram to the truss joint 237. This bar 242 is divided into two sections between which an energy-absorbing or dissipating element 218 is mounted which is combined with a back-rest adjusting device of which only the hand wheel 219 is shown which when turned varies the total length of bar 242 including the element 218. Depending upon whether bar 242 is lengthened or shortened, the truss joint 237 together with back rest 201 is shifted forwardly or toward the rear, while the inclination of the back rest remains unchanged.

The energy-dissipating element 218 permits the bar 242 to be extended only if in an accident the tension of a safety belt (not shown) which is secured to the back rest 241 increases to the bearable limit.

In order to permit the back rest 201 also to be adjusted to different inclinations, bar 241 is provided with an adjusting device 243 by means of which the total length of this bar may be varied. Such a change in the length of bar 241 causes the back rest 201 to be pivoted about the horizontal axis of the truss joint 237.

In addition to the back-rest adjusting device, bar 241 may also be provided with an energy-dissipating device similar to that which is inserted between the sections of bar 242. If in an accident the tension of the safety belt reaches the bearable limit, the back rest 201 would then carry out a combined pivoting and translatory movement since in addition to the longitudinal displacement by the changing position of the parallelogram there would also occur the pivoting movement of the back rest about the axis of the truss joint 237.

Figure 7:
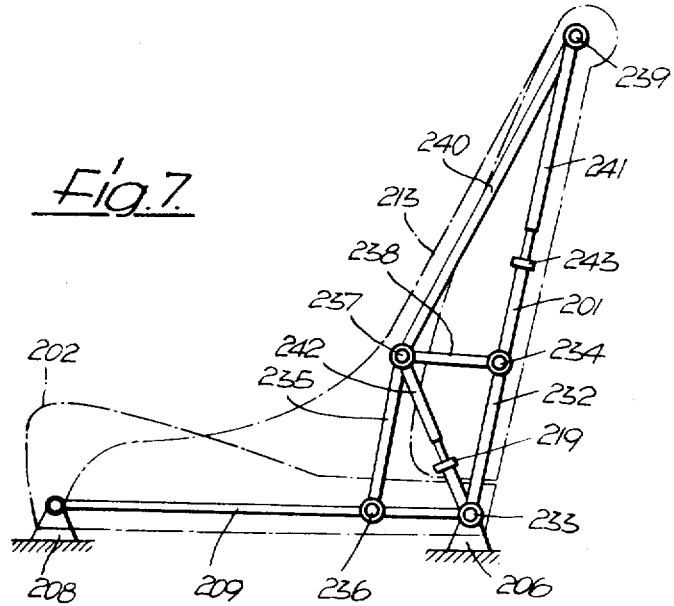
FIG. 7 shows a side view similar to FIG. 1 of a modification of the structure according to FIG. 6.

FIG. 7 illustrates a modification of the embodiment of the invention as shown in FIG. 6 which differs from the latter merely by the fact that each hingelike truss joint also forms a friction brake which permits the shape of the parallelogram to be changed only when the above-mentioned bearable tension of the safety belt is reached. These friction brakes then take over the function of the energy-dissipating element 218 which may therefore be omitted. Of course, the number of friction brakes in this structure may also be altered and be provided in a different arrangement relative to the truss joints.

FIG. 8 illustrates diagrammatically a vehicle seat which comprises a seat part 301 which is supported on a seat frame 302 on which a back rest 303 is mounted in a conventional manner, for example, by being rigidly connected to the seat part 301 or by being adjustable to different inclinations relative to the seat part by means of a back-rest adjusting device. At its front and rear ends, the two lateral sides of the seat frame 302 are pivotably connected to the upper ends of two pairs of legs 304 and 305 of equal lengths the lower ends of which are pivotably connected at corresponding distances from each other to the floor 306. All of the pivot axes of legs 304 and 305 extend horizontally and transverse to the longitudinal direction of the seat, and legs 304 and 305, together with the seat frame 302 and the floor 306 therefore form two equal parallelograms.

The upper hinge point of each front leg 304 is connected by a rod 307 to the lower hinge point of the associated rear leg 305. Rod 307 forms two sections between which an energy-dissipating element 308 is inserted which permits the effective total length of rod 307 to increase and at the same time the energy which is necessary for such an extension to be materially absorbed when in an accident an excessive tension is exerted upon rod 307. The energy-dissipating element 308 forms a unit together with a device 309 for manually adjusting the normal length of rod 307, i. e. the distance between the hinged outer ends of its two sections.

In this embodiment of the invention as illustrated in FIG. 8, rod 307 is made of such a length that in the normal sitting position of the seat occupant the legs 304 and 305 are slightly forwardly inclined from the floor 306. If a sudden deceleration of the vehicle occurs which exceeds a certain limit, a safety belt (not shown) with which the seat occupant is strapped upon his seat and one end of which is secured to the back rest 303 will transmit such a force upon the seat that the energy-dissipating element 308 will permit the effective length of rod 307 to be increased. The seat part 301 including the back rest 303 will thereby move forwardly and downwardly. At the same time the element 308 absorbs and dissipates some of the energy which is produced by the forward movement of the seat and its occupant. By manually adjusting the effective length of rod 307 by means of the adjusting device 309, it is also possible to change the angle of inclination of legs 304 and 305 relative to the floor 306 and thereby to vary the normal height of the seat part 301 from the floor.

FIG. 9 illustrates a modification of the seat supporting structure as shown in FIG. 8 which has the same advantage as the latter, namely, that in the case of an accident the back rest 313 is capable of being moved for a considerable distance against the action of the energy-dissipating element 318. The back rest 313 is connected to the seat part 311 in the same manner as in the embodiment according to FIG. 8. However, the seat part 311 is in this case supported on a seat frame 312 the rear end of which is bent downwardly to form rear rigid legs 315 at both lateral sides of the seat. The lower end of each of these two legs 315 is slidably mounted in an upwardly and forwardly inclined slot 320 in a bracket or the like which is rigidly secured to the floor 316.

The front end of the seat frame 312 is pivotably connected to a pair of legs 314 which like the front legs 304 in FIG. 8 are pivotably connected at their lower ends to the floor 316. The pivot axes at both ends of legs 314 extend horizontally and transverse to the longitudinal direction of the seat. The lower pivot axis of the front legs 314 is connected to the lower ends of the rear legs 315 by at least one rod 317 which together with the energy-dissipating element 318 and a length-adjusting device 319 forms a structural unit. The mode of operation of the adjusting device 319 is the same as that of the device 309 as described with reference to FIG. 8. The energy-dissipating element 318, however, operates in the reverse manner to the element 308 in FIG. 8, insofar as it effects a reduction of the effective length of rod 317 when a compressive force which exceeds a certain strength is exerted upon its opposite ends. While the effective length of rod 317 is thus being reduced which results in a forward tilting movement of the seat, such an amount of energy will be absorbed by the element 318 that at a sudden high deceleration of the car, for example, due to a head-on collision, the safety belt (not shown) which is secured to the seat will usually not exert such a pressure upon the seat occupant that the latter might thereby be injured.

In the embodiment of the invention as illustrated in FIGS. 10 to 12, the two front legs 324 of the seat which comprises a seat part 321 and a back rest 323 are designed in the same manner as the corresponding legs in FIGS. 8 and 9 and are pivotably connected at their upper ends to the seat frame 322 and at their lower ends to the floor 326. The upper ends of the two rear legs 325 are rigidly secured to the seat frame 322 similarly as shown in FIG. 9, while each of their lower ends slidably engages into a forwardly and upwardly inclined guide slot 330 in a bracket or the like which is secured to the floor 326.

The seat frame 322 is further provided on each lateral side with a leg 331 which is rigidly secured thereto and extends approximately from the center of its length at an oblique angle downwardly and toward the rear to the lower end of the rear leg 325. Each of these inclined legs 331 is provided with a longitudinal slot 332 into which one end of a rod 327 engages the other end of which is pivotably connected to the floor 326 so as to be pivotable, for example, about the pivot axis of the lower end of the front leg 324. Rod 327 is again divided into two sections between which an energy-dissipating element 328 is inserted which, when an excessive pressure of a certain strength is exerted upon the opposite ends of rod 327, shortens the total length of this rod and at the same time absorbs energy. This element 328 forms a structural unit together with a device for manually adjusting the normal length of rod 327 including the unit 328 and for thereby varying the height of the seat from the floor.

The end of rod 327 which engages into the longitudinal slot 332 is adapted to be manually locked in its upper and position by means of a hook 333. If this hook 333 is pivoted upwardly by hand, it releases the end of rod 327 which engages into the longitudinal slot 332 so that this end may slide to the other end of slot 332 as illustrated in FIG. 12. The seat may in this manner be shifted and tilted forwardly so as to permit a passenger, for example, of a two-door sedan, to enter the car easily behind the back rest 323 of the front seat so as to sit down on one of the rear seats.

If a sudden high deceleration of the vehicle occurs which exceeds a predetermined limit, the seat occupant who is strapped to the seat by a safety belt (not shown) pulls the seat by means of this safety belt forwardly with such a strength that rod 327 will be compressed and the energy-dissipating element 328 will become effective and reduce the length of rod 327, for example, to the position as illustrated in FIG. 11. Of course, the upper end of rod 327 which engages into the longitudinal slot 332 will at this time remain locked in its upper end position by the hook 333.

Figure 13:
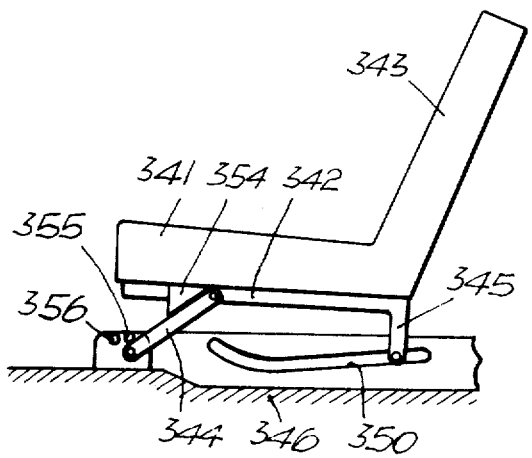
FIG. 13 shows a diagrammatic side view of a further embodiment of the invention.
Figure 14:
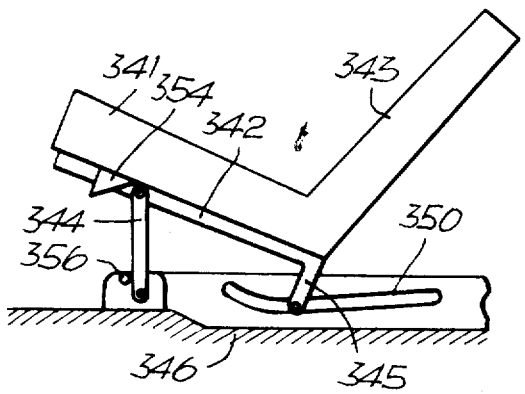
Figure 15:
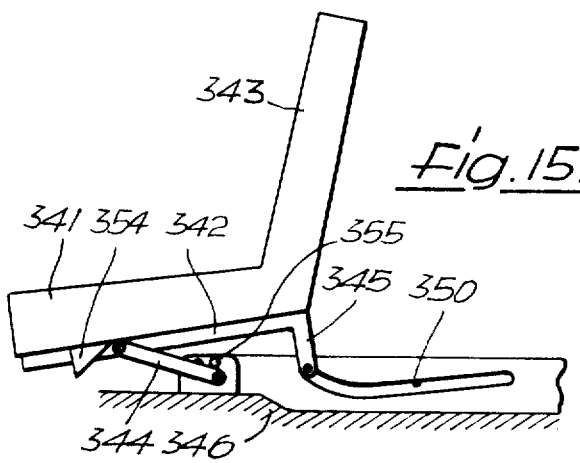
FIG. 15 shows a side view of the seat according to FIG. 13 in the entering position.

The further embodiment of the invention as illustrated in FIGS. 13 to 15 is likewise provided at both sides of the seat with a pair of front legs 344 the upper ends of which are pivotably connected to the seat frame 342 carrying the seat part 341, while their lower ends are pivotably connected to the floor 346. The pivot axes of legs 344 again extend horizontally and transverse to the longitudinal direction of the seat. The upper ends of legs 344 are, however, pivotably connected at such positions to the seat frame 342 that, when the seat is in its normal position as shown in FIG. 13, the front legs 344 extend at an oblique angle forwardly and downwardly from the seat. The rear end of the seat frame 342 is provided with two rigid downwardly projecting legs 345. The lower end of each of these legs 345 is guided in a slot 350 in a bracket or the like which is secured to the floor 346. From its rear end, this slot 350 is at first downwardly inclined until near its front end it curves upwardly.

In order to hold the seat in its normal position as shown in FIG. 13, each side of the seat frame 342 is provided with a stop projection 354, while from the bracket or the like which is secured to the floor and on which the lower end of the front leg 344 is pivotably mounted a shearing pin 355 projects which normally prevents the front leg 344 from pivoting forwardly. This shearing pin 355 which serves as an energy-dissipating element extends parallel to the pivot axis of leg 344 and is adapted to be moved manually in its axial direction from its active position in which it engages with the leg 344 to a retracted position in which leg 344 may pass over it.

If the vehicle in which this seat is mounted is suddenly decelerated beyond a predetermined limit, the tension which is exerted by the body of the seat occupant upon the safety belt with which he is strapped on this seat will be so strong that pin 355 will be shorn off by the leg 344. This shearing pin may be made of such a material and such a thickness that by being shorn off by the leg 344 the desired amount of the energy will be consumed which is produced by the propulsion of the seat occupant and the movement of the seat. When pin 355 has been shorn off, leg 344 may pivot upwardly about its lower end and thereby permit the seat to move to the accident position as shown in FIG. 14, in which the front edge of the seat part 341 is moved upwardly and its rear edge and the lower edge of the back rest 343 are moved downwardly and forwardly so that the entire seat is tilted considerably toward the rear. In this position of the seat, its occupant will be pressed by his inertia primarily against the seat part 341. The safety belt which is secured to the seat itself and is preferably elastic may not be absolutely required in this embodiment of the invention since the inertia which is exerted by the upper body of the seat occupant is at least taken up to a considerable extent by the tilting movement of the seat.

When the seat has thus been shifted to the accident position as shown in FIG. 14, it will be stopped since each of the front legs 344 will then abut against a stop member 356. This stop member 356 is preferably connected to the shearing pin 355 and likewise movable in its axial direction so that both together may be moved manually from their positions in which they project into the path of travel of the front leg 344 to their retracted positions in which this leg may be pivoted forwardly without engaging with either of these abutments. The empty seat may then be shifted forwardly from its normal position as shown in FIG. 13 and past the accident position according to FIG. 14 to the entering position as shown in FIG. 15, in which the lower end of each rear leg 345 abuts against the front end of the upwardly curving part of the associated guide slot 350 and the seat including its back rest is shifted and tilted so far forwardly that a passenger, for example, of a two-door sedan, may easily enter the car behind this seat so as to sit down on a rear seat.

Of course, in addition to the shearing pins 355 additional energy-absorbing or dissipating means may be provided, for example, in the form of a friction brake on one or both pivoting points of each front leg 344.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A seat for a motor vehicle having a seat part and a back rest pivotally connected to said seat part near the rear end of the latter so as to be pivotable about an axis extending substantially horizontally and transversely to the longitudinal direction of said seat part, a seat occupant being adapted to be strapped by a safety belt which is secured to the seat and at least one end of which is secured to the back rest, a truss means supporting said seat part and being mounted on said base, said truss means comprising a plurality of rods and joints connecting the adjacent rods to each other and being disposed in a plane extending substantially normal to said base and combination energy-dissipating means and back rest adjusting means for manually adjusting the normal angle of inclination of said back rest relative to said seat part, said combination energy-dissipating and back rest adjusting means being interposed in at least one of said rods of said truss means and being connected to said seat part.

2. A seat as defined in claim 1, in which said truss means comprise one first truss on at least one lateral side of said back rest and a second truss on the same side of said seat part and connected to said first truss.

3. A seat as defined in claim 1, in which said rods of said truss means are connected to each other by joints so as to form a triangle.

4. A seat as defined in claim 2, in which the rods of each of said first and second trusses are connected to each other by joints so as to form a triangle, two adjacent rods of said seat-part truss projecting upwardly, one of said two rods being common with and also forming one of the rods of said back-rest truss, and the joints on the ends of said common rod connecting the same to the two other rods of each of said trusses.

5. A seat as defined in claim 4, in which at least two of said joints of said two trusses form hinges pivotably connecting the rods adjacent to said hinges so as to be pivotable relative to each other within the plane of said truss means.

6. A seat as defined in claim 1, in which said combination energy-dissipating and back rest adjusting means comprise at least two elements, one of said elements being movable relative to the other element so as to act thereon in a manner so as permanently to deform the same when said pressure of said safety belt upon the body of said seat occupant reaches substantially said bearable limit.

7. A seat as defined in claim 1, in which said combination energy-dissipating means and back rest adjusting means are adapted to consume energy when subjected to compressive stresses and also when subjected to tensile stresses.

* * * * *